Feb. 10, 1970 — J. R. ROBERTS — 3,494,824
FOAMED WATER FELTED INSULATION AND BUILDING PRODUCT
Filed Dec. 27, 1965
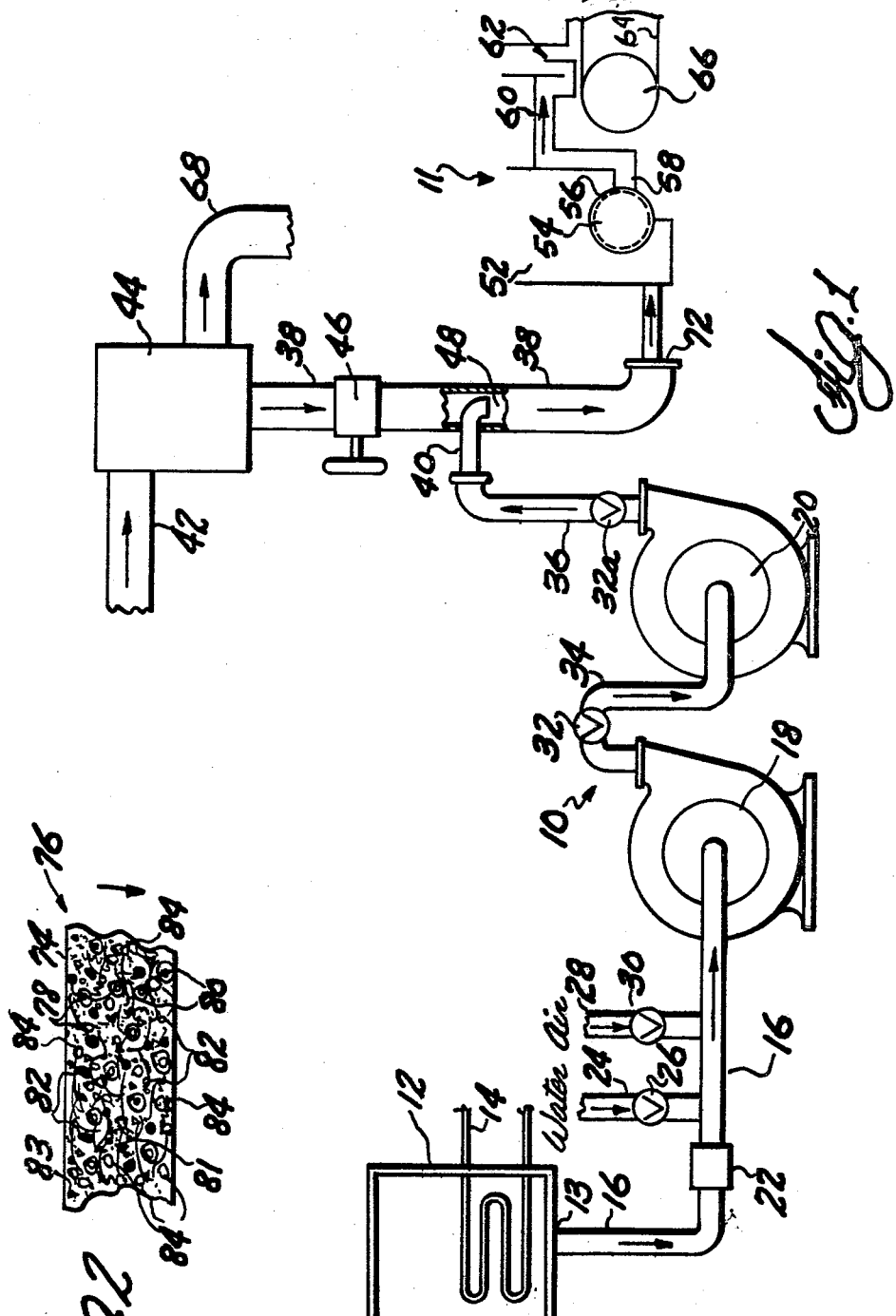
INVENTOR.
James R. Roberts
BY Pendleton, Neuman,
Seibold & Williams
Attorneys

3,494,824
FOAMED WATER FELTED INSULATION AND BUILDING PRODUCT
James R. Roberts, Palatine, Ill., assignor to United States Gypsum Company, Chicago, Ill., a corporation of Illinois
Filed Dec. 27, 1965, Ser. No. 516,534
Int. Cl. D21h 5/18
U.S. Cl. 162—152                                    9 Claims

ABSTRACT OF THE DISCLOSURE

A lightweight uniform monolithic boardlike product in sheet form is made by admixing a stabilized foam with an aqueous furnish containing a mineral product such as mineral wool or expanded perlite and a binder consisting of water-activated cellulose gel in aqueous slurry form having a Schopper-Riegler freeness of less than about 100 ml., and forming a mat upon a Fourdrinier wire.

---

This invention relates to the manufacture of a foamed mineral product and more specifically to improvements in the manufacture of an improved low density water felted insulation and acoustical product from compositions containing certain mineral or mineral derived materials of variable density upon a Fourdrinier or similar machine.

The use of Fourdrinier machines to form water felted heat insulation, sound control and other boardlike products from certain mineral materials such as expanded perlite and/or mineral wool with a binder is described in my copending applications Ser. Nos. 338,056 and 338,057, filed Jan. 16, 1964 now Patent Nos. 3,379,608 and 3,379,609 respectively. The binder utilized in those procedures is a mechanically induced water activated hydrated cellulosic binder formed by subjecting a chemically cooked paper pulp, such as kraft, to an intense mechanical hydration to give a Schopper-Riegler freeness in its original hydrated state of less than about 100 ml.

In the aforementioned formation of such products upon a Fourdrinier, the components forming the mineral based building, insulating or acoustical products are suspended in water at a solids content of between about 3 to 8%. This is a quite fluid or free flowing furnish. This fluid suspension of solid material is distributed in an even thickness onto a continuous open mesh moving belt, called the wire, in the case of the Fourdrinier machine. A substantial portion of the water is removed through the wire by means of drainage assisted by a vacuum system. The resultant thickened mat is then subjected to roll pressure and vacuum for the removal of additional water and to densify the mat as well as to improve the appearance of the surface.

After drying, the sheets are cut into various sizes and further fabricated, if desired, into industrial or sound control products, such as by perforating or the like, all as described in the aforesaid applications.

Inasmuch as the solid components are in aqueous suspension when placed upon the wire, there is a tendency for the heavier materials to settle out or the lighter materials to float to the top before sufficient water is removed to prevent such stratification from taking place. This not only results in a less satisfactory product, but also in some cases there is an interference with the removal of the water therefrom by means of the suction. This is especially true with those minerals containing insulation and building products which have heavier constituents, such as beads, in the case of mineral wool and unexpanded ore in the case of perlite. Heavy components have a tendency to quickly migrate to the bottom next to the wire and hence interfere with suction and thereby result in a commercially undesirable appearance of the final product.

When a lightweight mineral product, such as expanded perlite is used in a formulation, it tends to float on top and thus contributes to a nonuniform product.

This stratification of solids is especially evident when a furnish of very fluid consistency is used, and there is a much greater tendency for material of different densities to stratify upon the Fourdrinier wire.

In addition when finer size particles, such as clay or reprocessed waste materials, are used in a formulation they tend to coat the wire and interfere with the removal of water.

It also has been found that certain binders interfere with the removal of water more than others. For example, a cooked starch binder will retard the flow of water through the mat more than when uncooked starch is used and less than the mechanically induced water activated cellulosic binder referred to above.

In the production of a light weight product from heavy mineral materials, such as mineral wool, clay, etc., it is difficult to control the density by merely a variation in the pressure upon the rolls usually used to control the weight of the final product and to remove water. For example, such cannot be used to attain a density for a composition where density after formation upon the wire is higher than that which is desired; hence, the removal of the entire pressure on the rolls is still insufficient. Also, it has been found that the lowering of the pressure on the rolls markedly decreases the surface smoothness. This uniform surface appearance detracts from the useability of the product for a finished surface, as in the case of ceiling tile. This problem of surface uniformity is further magnified when an excessive amount of water is present upon the surface which is experienced when a lower density is obtained by means of a lesser amount of pressure. When the water evaporates it accentuates the roughness due to clumps of material which have a tendency to form, especially when the mixing has taken place at a less fluid consistency.

The above disadvantages are not serious problems in making paper or boards with cellulosic fibers, as no additional binder or material of markedly different densities in aqueous suspension are ordinarily used, the cellulosic fibers and other components being of essentially uniform and matched density and more readily held in suspension. Even in the production of a product from suspended mineral material all of the above disadvantages are not necessarily so serious that a Fourdrinier machine cannot be used to form a sheetlike product, but careful regard must be given to control of mixing, sheet formation and the like to prevent the products which do not have ready commercial acceptance. Thus, the operation of the process and the resulting quality of the product would be markedly improved if the foregoing problems could be alleviated in some convenient manner. It has been found that such improvement ensues if foam is used in a novel manner which will be subsequently set forth.

It is therefore an object of this invention to provide a more even and uniform vertical distribution of suspended mineral type particles on a Fourdrinier wire.

It is an additional object to provide a product formed from suspended material upon a Fourdriner which is more uniform throughout.

It is a further object of this invention to provide an improvement in the removal of water in the formation of products upon a Fourdriner when finer particles such as reprocessed waste material, clay, fine perlite or asbestos fibers are in suspension.

It is an added object of this invention to provide a lightweight product having a relatively smooth surface when formed upon a Fourdrinier.

It is an additional object of this invention to set forth an improvement in the rate of removal of water upon a Fourdrinier when certain binders are used.

It is a still further object of this invention to provide a means of improving the distribution and retention of a binder, such as a synthetic resin, in a mat formed upon a Fourdrinier.

It is also an object of this invention to provide a means for materially decreasing the density of a mat formed upon a Fourdrinier with a substantial decrease in the total amount of moisture which must be removed by drying and at the same time providing a final board product with an unusually smooth surface.

Another object is the provision of novel means for uniformly distributing a foam into a suspended aqueous slurry of mineral materials to be formed upon a Fourdrinier machine.

It is a still further object of this invention to provide a foam which can be dispersed into an aqueous suspended material to give good forming action upon a Fourdrinier which improves drainage rather than impedes it.

It is a further object of this invention to obtain a lightweight product from an aqueous suspension of mineral material upon a Fourdrinier which has a lower amount of moisture before drying.

These and other objects will more readily be seen by reference to the following specification, appended claims and attached drawing.

For a more complete understanding of the present invention reference is made to the drawings in which:

FIG. 1 is a schematic illustration of the formation of a foam and its distribution into the furnish of a Fourdrinier machine, in accordance with the process of this invention, and FIG. 2 is an enlarged cross-section of a typical product formed upon a Fourdrinier in which there is a substantially uniform distribution of light and heavyweight particles throughout.

Accordingly, in one broad form the present invention comprises a lightweight, unified monolithic boardlike product in sheet form having a density range of from about 3 to 25 pounds per cubic foot, containing, component materials having markedly different densities including:

(A) a mineral product selected from the group consisting of thermally expanded perlite, mineral wool, or mixtures thereof, and
(B) a binder selected from the group consisting of starch and water activated cellulose gel in aqueous slurry form having a Schopper-Riegler freeness of less than about 100 ml., or mixtures thereof, said board having a relatively smooth top surface and being characterized by the substantially uniform distribution of said components throughout the vertical cross section of the boards, said board having a uniform porous cellular structure, the original definition of the said cells in said board being provided by foam.

The present invention also relates to improved method for producing water felted products of the aforesaid description which improvement includes the addition and admixture of a stable foam into a furnish containing a mineral product and a binder in an aqueous suspension, depositing said admixture on the wire of a Fourdrinier machine, removing a portion of the water from said furnish thereby forming a felted mat from said admixture while maintaining the integrity of said foam, compressing and smoothing said felted mat to further expel excess water therefrom but essentially maintaining the foam intact, and drying said mat to a product having a cellular structure and a smooth top surface.

Referring to FIG. 1 of the drawing, there is shown a foam generator 10 and a portion of a Fourdrinier type machine 11. The foam generator 10 includes a foaming agent storage tank 12 equipped with heating coils 14. The tank 12 is provided with an outlet 13 and conduit 16 which feed into a series of high speed centrifugal pumps 18 and 20. A metering device 22, such as a gear pump, is provided in the conduit 16 to meter foaming agent in measured quantity from tank 12. Water is fed into line 16 via line 24 equipped with an indicating metering device 26, such as a rotometer. Air is also fed into line 16 via line 28 equipped with intermediate variable pressure reducing valve 30. The mixture of foaming agent, water and air in metered proportions passes through conduit 16 into the pumps 18 and 20. The pumps 18 and 20 operate against a specified pressure which is controlled by pressure controllers 32 and 32a on the outlet side of the pumps 18 and 20, respectively, in lines 34 and 36. It has been found that generation of the foam under pressure produces a superior foam product. The feed line 36 should have a smooth interior surface, such as may be provided by a plastic hose. For best results line 36 should be 50 feet long from pump 20 to the point of feed into the furnish line 38.

The foam passing through line 36 is fed into the furnish line 38 by feed inlet 40. The furnish used in the manufacture of the water felted product is prepared by another sequence of steps as shown and described in my aforesaid copending applications, and passed via line 42 to overflow box 44 and thence into line 38 for mixing with the foam fed by line 36 and feed inlet 40. The furnish line 38 is equipped with a valve 46 adapted to control the flow of furnish in line 38. The foam mixing with the suspended solid material and gel in the furnish in line 38, at the point designated as 48, passes through line 38 to the furnish head box 52 of the Fourdrinier machine. Further mixing in the head box is accomplished by means of a rectifier roll 54 which is a revolving perforated cylinder extending the entire lateral width of the head box 52. All of the furnish and foam mixture in box 52 passes through the perforations 56 in the cylinder or rectifier roll 54 and out of the cylinder 54 through outlet slot 58 and via conduit 60 into a baffle section 62 and then onto the Fourdrinier wire 64 passing over roll 66. The furnish deposited on the wire 64 is dewatered by gravitation and vacuum means. The resulting dewatered mat is pressed by a series of rolls (not shown), cut to length, and dried, as described in my aforesaid copending applications.

It should be pointed out that in the formation of foamed products solely from cellulosic material, such as paper pulp, the fibers may be suspended in the foamable solution prior to the production of the foam, see Patent No. 1,740,280. This assures an equal distribution of the fibers throughout the foam. However, in the present case of a composition which contains mineral materials it is not feasible to form a foam in this manner as materials, such as expanded perlite, mineral wool, etc., are readily disintegrated by such violent action, and the product formed has poor drainage properties and lower final dry strength.

The cellulosic gel binder referred to above is a highly hydrated gelatinous substance formed by subjecting a cooked cellulosic material, preferably unbleached waste kraft stock, to an intense refining, such as in a Hydropulper, a deflaker and a series of refiners equipped with lava tackle to a Schopper-Riegler freeness of less than about 100 ml., as described in my above referred to copending applications. The defined cellulosic binder is stored in a stock tank from which it is withdrawn to be mixed with expanded perlite and/or mineral wool and other ingredients, such as clay, reprocessed broke, asbestos fibers, wood fibers, size, etc., in a mixing chest. The mix is then sent to the machine chest that supplies the Fourdrinier machine. If a starch or other type binders are used, they can also be added to the mixer in addition to or in place of the above mentioned cellulosic binder.

If it is necessary to precook the starch, suitable equipment, well known in the art, can be used for this purpose. The cooked starch solution is then added to the mixing chest.

The process of forming boardlike products upon a Fourdrinier machine is well known to those skilled in the art and therefore a detailed description thereof is not necessary; only such portion of the machine and other processing equipment relating to the particular invention will be included in this description.

In the operation of the Fourdrinier in the present process, the furnish, which is between 3 to 8% solids, is kept in a machine chest and pumped therefrom into an overflow box, which is shown as 44 in the accompanying drawing. The furnish for the machine is withdrawn from the bottom thereof through the pipe 38. Any surplus material in the overflow box or tank leaves through the pipe 68 and recirculates back to the machine chest, not shown.

It has been found that the foam should, for best results, be introduced at any point between the overflow tank and the head box 52. Preferably, the foam should be added some distance back of the head box so as to obtain the advantage of the turbulence in the line to effect a distribution of the foam in the furnish. A good location is somewhere between the control valve 46 and the point 72 where the furnish line feeds to the head box if desired through a plurality of lines (not shown) to give a better distribution in the head box.

The foam can be generated in a number of ways known to the art. A preferred method is by means of a Hercules foam generator system.

It will be found that the furnish, though flowable when it reaches the Fourdrinier, will, when on the wire, quickly become like a pudding, due to the expanded foam therein, the expansion of the foam being derived from the reduction of pressure on the foam entering the head box. This thickening effect entraps any heavy beads left in the mineral wool as well as the perlite. This results in very little separation or stratification of the mineral components. In addition, the body of the sheet on the wire is opened up by the foam so that any fine material will not adversely retard the drainage of the water from the mat. The foam should be sufficiently stable and tenacious to resist the action of the press rolls so that a lighter weight product with a smooth surface may be formed. These foam cells are subsequently destroyed during drying but the original cell definition in the board derived from the foam remains. The fibers of mineral wool are oriented in a horizontal direction which, along with the lack of stratification, gives a product which is unique in appearance in section.

Various foaming agents may be used, such for example as potassium rosin size; a mixture of 50% Vinsol and 50% Belro, known as No. 249; powdered Vinsol; Vinsol NVX; and preferably a 50% Vinsol soap. Vinsol is an aromatic solvent soluble resin left after the extraction of rosin, etc., by aliphatic solvents. (See Patents Nos. 2,193,026 and 2,168,399.) Belro is a dark acidic thermoplastic modified rosin. All of these products are made by the Hercules Company.

The density of the foam can vary between wide limits, such as from about 6 to about 16 pounds per cubic foot with 7 to 12 pounds per cubic foot being the usual range.

The foam solution feed and hence the amount of foam delivered to the system is controlled by the speed of the proportioning gear pump 22. The percentage of water in the foam is measured by the rotometer 26. Hence the amount of foam added and its density is controlled by foam liquid flow, type of foam liquid, air pressure and volume and water volume. The following Table 1 shows the relationship of the air pressure, the amounts of water and foam per minute to the density of the foam.

TABLE 1.—VINSOL SOAP FOAM—AMOUNT OF FOAM SOLUTION

| Water, gals./min. | Pump, r.p.m. | Pounds Per Min. | Air Pressure, lbs./in.$^2$ | Foam Wt., lbs./cu. ft. |
|---|---|---|---|---|
| 2.0 | 54 | .365 | 33 | 8.5 |
| 3.33 | 54 | .365 | 33 | 9.8 |
| 5.0 | 54 | .365 | 33 | 11.7 |
| 2.0 | 100 | .677 | 33 | 7.35 |
| 3.33 | 100 | .677 | 33 | 9.0 |
| 5.0 | 100 | .677 | 33 | 10.2 |
| 2.0 | 180 | 1.42 | 33 | 6.9 |
| 3.33 | 180 | 1.42 | 33 | 9.0 |
| 5.0 | 180 | 1.42 | 33 | 9.9 |

In a specific example of a preferred method of practicing this invention, foam was added, at the rate of 3.16 cubic feet of foam per minute, to the furnish. The forming speed of the Fourdrinier was 240 square feet of ½ inch, or 184 square feet of ⅝ inch board per minute. The machine makes a sheet of 8 feet wide and hence the lineal speeds are 30 and 23 feet per minute, respectively. At the above speeds and rate of foam addition a typical reduction in density is from 22 to about 19 pounds per cubic foot for a ½ inch board and from 21 to about 18 pounds per cubic foot for a ⅝ inch thick board. The density reduction depends somewhat upon the formula used.

Examples of typical compositions using various amounts of foam, which are within the teachings of this invention, are shown in the following Table 2. The various ingredients are shown in percent by weight.

The amounts of foam used in the following Table 2 are only exemplary, and foam may be incorporated in amounts of from 5 to 50 cubic feet per 1000 square feet of board in thickness ranging from ⅜ inch to 1½ inches and preferably from 6 to 35 cubic feet, and most preferably from 10 to 25 cubic feet of foam on the same board basis. The board thicknesses are on the final dry product. It should be understood that while the foam incorporated represents a certain volume addition and a correlative density reduction, a variable amount of loss will occur during processing, depending upon the stability of the foam and the degree of pressing. Of course a variety of foaming agents can be employed other than those specified.

TABLE 2.—⅝ INCH BOARD PRODUCT

| Formula Number | 1* | 2 | 3 | 4* (a) | 5 | 6 | 7 | 8 | 9 |
|---|---|---|---|---|---|---|---|---|---|
| Cellulosic Gel Binder | 18 | 12 | 10 | 15 | 12 | 7 | 7.5 | 12 | 0 |
| Expanded Perlite | 9 | 9 | 9 | 63 | 0 | 0 | 9 | 30 | 0 |
| Mineral Wool | 70 | 74 | 61 | None | 83 | 86 | 74 | 51 | 71 |
| Starch, dry (Tapioca) | 1 | 3 | 2 | 5 | 3 | 5 | 7.5 | 0 | 12 |
| Additives-Size, Alum | 2 | 2 | 2 | 2 | 2 | 2 | 2 | 2 | 2 |
| Clay | | | 16 | 15 | | | | 5 | 10 |
| Wood fiber | | | | | | | | | 5 |
| Type of Foam | 249 | V | V | V | V | 249 | 249 | V | V |
| Amt. of foam per M sq. ft. in cu. ft. | 20.6 | 11.65 | 11.65 | 22.25 | 11.65 | 11.65 | 11.65 | 11.65 | 11.65 |
| Density (dry): | | | | | | | | | |
| Without Foam | 17.5 | 20.5 | 22.5 | 18.0 | 21.0 | 20.1 | 19.8 | 18.7 | 23.7 |
| With Foam | 14.1 | 15.5 | 17.3 | 13.2 | 14.6 | 16.2 | 15.8 | 14.4 | 17.6 |

See footnotes at end of table.

TABLE 2—Continued

| Formula Number | 1* | 2 | 3 | 4* (a) | 5 | 6 | 7 | 8 | 9 |
|---|---|---|---|---|---|---|---|---|---|
| Tipple Moisture: | | | | | | | | | |
| Without Foam | 5,700 | 3,060 | 2,710 | 2,980 | 2,790 | 2,600 | 2,570 | 2,470 | 2,520 |
| With Foam | 4,570 | 2,100 | 2,200 | 2,340 | 2,170 | 2,260 | 2,250 | 1,870 | 2,025 |
| MOR: | | | | | | | | | |
| Without Foam | 135 | 205 | 185 | 145 | 210 | 190 | 195 | 170 | 345 |
| With Foam | 120 | 165 | 142 | 105 | 153 | 150 | 166 | 140 | 327 |

Density: Lbs./cubic foot.
MOR: Modulus of rupture, lbs./in.$^2$.
Tipple Moisture: Pounds per 1,000 square feet of board.
1*: 1⅛″ thick boards.
4*: ⅞″ thick boards.
V: 30% Vinsol Soap Solution.
249: Mixture of 50% Vinsol and 50% Belro.
(a): This product was also made with 10% of perlite replaced with asbestos fiber.

The products prepared in the foregoing examples may be exemplified by reference to FIG. 2 of the drawing, which shows an enlarged section of the dried board product. In that figure, illustrated schematically, the components are randomly and uniformly distributed throughout the vertical cross section taken from the top 74 of the board 76 in the direction of the arrow. In that cross section are illustrated expanded perlite 78, shown as double wall spheres in cross section, fibers such as mineral wool fibers 80, dried binder 81, such as cellulose gel or starch, mineral wool beads or shot 82, and unexpanded perlite ore or fines 83. Also shown as single wall spheres 84 are the cells or voids which were originally occupied by the foam bubbles in the wet mat state, and upon drying remain as a plurality of pores to define a cellular porous structure of reduced density. It should be understood that the drawing is only schematic, since in actuality the particles of perlite, mineral wool, binder gel, fines and mineral wool beads or shot are very much smaller than shown, and the cells or void 84 are very small and, as in the other instance, infinitely multiplied. Microscopic examination however would reveal a structure similar in principle to that shown.

The formulas in the foregoing table illustrate a wide range of possible products which may be prepared in accordance with the present invention. Accordingly, the mineral wool may be present in amounts of from 0 to 85%, the perlite from 0 to 85%, preferably 0 to 65%, the cellulose gel binder in amounts of from 0 to 30%, preferably from 0 to 20%, the starch binder in amounts of from 0 to 30%, preferably from 0 to 20%, clay (bentonite and the like) from 0 to 20%. These weights are all on a dry weight basis. Other minor additives, such as alum, 1 to 3%, and wood fiber, are also used, but they are not essential components. It should be emphasized that the basic structure of the board products involves at least one mineral product, such as perlite, mineral wool, or both, and a binder, such as cellulose gel, starch, or both.

It should be noted that the incorporation of foam results in substantially reduced final densities for the dried product. Thus in typical board products shown in Table 2, the range of densities is from 18–22.5 lbs./ft.$^3$ without foam and from 13.2 to 17.3 lbs./ft.$^3$ with foam for the same formulations. On the basis of equivalent densities the MOR (modulus of rupture) with foam is essentially the same or higher.

It should be understood that when reference is made to mineral wool, other fibrous mineral materials of a ceramic nature may also be used in place thereof, such as glass wool and asbestos, although mineral wool per se is preferred.

In addition, it will be found that due to the action of the foam, the mineral wool fibers will tend to be oriented in a horizontal direction, which will aid in lateral infiltration of air so important in effecting an improvement in sound absorption. The uniformity of formation of the various ingredients, regardless of the density in aqueous suspension and the horizontal formation of the fibers, are readily discernible upon a close examination of a section through the board.

A marked advantage of this invention is the improvement in the surface of a board, especially at low densities. With a stable foam, sufficient of the cells remain intact through the pressing and dewatering operations so that a much higher pressure can be used for a given ultimate density than without the foam. This extra pressure, obviously enables a smoother surface to be formed. Also, foam decreases the amount of water within the mat which must be removed by drying, so that irregular shrinkage, due to a variation in the percentage of water absorbed in different minute areas on the surface, is not as pronounced. Since one portion holds more water than another it will shrink more, thus contributing to surface irregularity especially if there is a high overall moisture content. The lesser amount of water in the foamed product decreases such irregularity.

Some of the aforesaid irregularity in drying is due to clumps of material, such as mineral wool, not being thoroughly dispersed in the mixing tank, basically due to a fairly thick furnish which is ordinarily used to decrease stratification upon the Fourdrinier wire. When foam is used a much thinner mixing consistency can be used as the foam tends to thicken the furnish. A thinner mix results in improved dispersion, hence there are fewer clumps and consequent decrease in surface irregularities due to drying.

When a proper type foam is used, such as 50% Vinsol soap, the drainage rate of the water on the Fourdrinier is not decreased. This soap, which is formed by a reaction of Vinsol with an alkali, is received as a 50% solution. It is quite thick at room temperature and hence should be heated to at least 150° F. before using.

The use of a foam also permits materials, which ordinarily form a tight high density board, to be used in forming a low density porous board.

This improvement enables a larger percentage of reprocessed waste material, sometimes referred to as broke, to be used; this can be as high as 35%. When dry broke, especially that containing the cellulosic gel as a binder, is reprocessed, it requires a high degree of refining which results in a large amount of very fine material.

The use of foam aids in the effectiveness of the binder by improving its dispersion and retention throughout the wet product. This advantage is also seen when resins, such as for example, urea formaldehyde or phenol formaldehyde resin are dispersed in conjunction with foam throughout the composition. While some of these resins have foaming properties of their own, it is insufficient, and additional foam is needed.

Further beneficial results are obtained by the addition of about ½% of liqiud 60% solids phenol-formaldehyde resin into the foam to give a marked increase in the board hardness and resistance to sag at a high moisture and temperature condition. It requires 3% of the same resin added without a foam to give equivalent results because the unfoamed resin is not retained in the wet board.

The lower density product obtained by the use of foam is much superior, in respect to top surface smoothness, to a product obtained by reducing the pressure on the dewatering rolls. When the pressure is decreased a much rougher surface is obtained upon the finished product. It has also been found that the tipple moisture content of the mat going to the drier will be about 10% less when the density reduction is obtained by means of incorporating a foam rather than by lowering of the roll pressure. A much lower density can be obtained with foam because on the Fourdrinier drainage an unfoamed stock will not produce a very low density product even when no pressure is used; this is especially true with reprocessed broke and/or heavy mineral formulations. The foam retains its structure for a sufficient period during drying to prevent densification due to the removal of water.

I claim:

1. A method of reducing the amount of moisture which must be removed by drying a water felted sheet to produce an insulation board product and improving the uniformity of distribution of constituents thereof of variant density which comprises suspending mineral components of variant density in water containing a binder of density different from any of said mineral components, admixing a stable pregenerated foam with said suspension, depositing the foam containing admixture on a forming wire, removing a portion of the water by drainage through said wire while retaining said foam, binder, and mineral components in substantially uniform suspension on said wire, subjecting the thus formed wet mat to a smoothing compression step to remove additional water while retaining said foam, binder, and mineral ingredients in said mat, whereby to produce a wet mat having a cellular structure defined by said foam and a water content less than that possible without the incorporation of said foam, and drying said mat to produce an insulation board product.

2. A process according to claim 1 wherein the mineral components are selected from the group consisting of thermally expanded perlite, mineral wool or mixtures thereof.

3. A process according to claim 1 wherein one of the mineral components is expanded perlite present in amounts of up to 85%.

4. A process according to claim 1 wherein the binder is cellulose gel present in amounts up to 30%.

5. A process according to claim 1 wherein the binder is starch present in amounts of up to 30%.

6. A process according to claim 1 wherein one of the mineral components is mineral wool.

7. A process according to claim 1 wherein said binder includes a thermo setting formaldehyde condensate.

8. A process according to claim 1 wherein said foam contains a thermo setting formaldehyde condensate.

9. The product of the process of claim 1.

References Cited

UNITED STATES PATENTS

| | | | |
|---|---|---|---|
| 1,870,279 | 8/1932 | Bryant | 162—101 |
| 2,264,189 | 11/1941 | Richter et al. | 162—123 |
| 2,634,207 | 4/1953 | Miscall et al. | 162—152 X |
| 3,006,805 | 10/1961 | Waggoner | 162—101 |
| 3,007,840 | 11/1961 | Wilcox | 162—101 |
| 3,214,393 | 10/1965 | Sefton. | |
| 3,379,608 | 4/1968 | Roberts et al. | 162—145 |
| 3,379,609 | 4/1968 | Roberts | 162—181 |

S. LEON BASHORE, Primary Examiner

R. D. BAJEFSKY, Assistant Examiner

U.S. Cl. X.R.

162—164, 175, 225